(12) United States Patent
Urushihara et al.

(10) Patent No.: US 8,829,084 B2
(45) Date of Patent: Sep. 9, 2014

(54) REINFORCED POLYESTER RESIN COMPOSITION

(75) Inventors: Tsuyoshi Urushihara, Saitama (JP); Yota Tsuneizumi, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/255,787

(22) PCT Filed: Mar. 10, 2010

(86) PCT No.: PCT/JP2010/053959
§ 371 (c)(1),
(2), (4) Date: Sep. 9, 2011

(87) PCT Pub. No.: WO2010/104103
PCT Pub. Date: Sep. 16, 2010

(65) Prior Publication Data
US 2012/0004363 A1 Jan. 5, 2012

(30) Foreign Application Priority Data
Mar. 12, 2009 (JP) ................................ 2009-060262

(51) Int. Cl.
*C08K 5/3415* (2006.01)

(52) U.S. Cl.
USPC .......................................................... 524/94

(58) Field of Classification Search
USPC .................................................. 524/168, 94
See application file for complete search history.

(56) References Cited

U.S. PATENT DOCUMENTS

| | | | |
|---|---|---|---|
| 4,254,015 A | 3/1981 | Thomas et al. | |
| 4,378,444 A | 3/1983 | Barenberg et al. | |
| 4,753,975 A * | 6/1988 | Vanderkooi, Jr. | 524/539 |
| 5,115,016 A * | 5/1992 | Dickens et al. | 524/513 |
| 6,740,697 B1 * | 5/2004 | Brenner et al. | 524/166 |
| 8,017,678 B2 * | 9/2011 | Horikoshi et al. | 524/168 |
| 8,058,334 B2 * | 11/2011 | Horikoshi et al. | 524/168 |
| 2009/0176913 A1 | 7/2009 | Horikoshi et al. | |
| 2010/0113710 A1 | 5/2010 | Horikoshi et al. | |
| 2011/0015319 A1 | 1/2011 | Nomura | |

FOREIGN PATENT DOCUMENTS

| | | | | |
|---|---|---|---|---|
| EP | 2077298 | * | 7/2009 | ............. C08L 67/02 |
| JP | 51-7702 | | 3/1976 | |
| JP | 9-301746 A | | 11/1997 | |
| JP | 10-212417 | * | 8/1998 | ............ C08L 101/00 |
| JP | 2001-040219 A | | 2/2001 | |
| JP | 2001-172055 A | | 6/2001 | |
| JP | 2001-172056 A | | 6/2001 | |
| JP | 2001-172057 A | | 6/2001 | |
| JP | 2006-016557 A | | 1/2006 | |
| JP | 2007-327028 A | | 12/2007 | |
| JP | 2009-096833 A | | 5/2009 | |
| WO | WO 2007/129527 A1 | | 11/2007 | |
| WO | WO 2008/038465 A1 | | 4/2008 | |
| WO | WO 2009/116499 A1 | | 9/2009 | |

OTHER PUBLICATIONS

Machine translation of JP 10-212417. Aug. 1998.*
International Search Report, PCT/JP2010/053959, Jun. 8, 2010.
Partial human English translation of JP 10-212417, published Aug. 11, 1998.
European Search Report dated Mar. 20, 2014, issued in corresponding European Patent Application No. 10750856.6.

* cited by examiner

*Primary Examiner* — John Uselding
(74) *Attorney, Agent, or Firm* — Birch, Stewart, Kolasch & Birch

(57) ABSTRACT

The present invention provides a reinforced polyester resin composition, which comprises, with respect to 100 parts by mass of a polyester resin, 0.01 to 400 parts by mass of an inorganic filler as component (A) and 0.001 to 10 parts by mass of a metal salt of a sulfonamide compound as component (B), the metal salt of the sulfonamide compound having a structure represented by Formula (1):

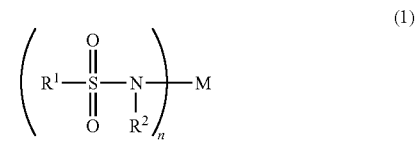

wherein $R^1$ and $R^2$ independently represent a hydrogen atom or the like; $R^1$ and $R^2$ are also optionally linked together to form a cyclic group; n represents number of 1 or 2; when n is 1, M represents an alkali metal atom or the like; when n is 2, the plural $R^1$s and $R^2$s are each optionally different; M represents a divalent metal atom or linking group; and when M is the linking group, either of $R^1$ and $R^2$ is an alkali metal.

4 Claims, No Drawings

REINFORCED POLYESTER RESIN COMPOSITION

This application is a national stage entry of PCT/JP2010/053959 filed Mar. 10, 2010, which claims priority to JP 2009-060262 filed Mar. 12, 2009.

TECHNICAL FIELD

The present invention relates to a reinforced polyester resin composition having a high crystallization rate and superior moldability, from which a molded article having low shrinkage anisotropy and superior surface properties can be obtained.

BACKGROUND ART

Thermoplastic polyester resins such as polyethylene terephthalate resin (hereinafter, may be abbreviated as PET), polybutylene terephthalate resin (hereinafter, may be abbreviated as PBT) and polylactic acid are themselves excellent in mechanical and electrical properties, as well as in chemical resistance, heat resistance and the like; therefore, they are widely used as engineering plastics and materials for producing various parts of electric appliances and electronics, interior and exterior parts of vehicles such as automobiles, trains and electric railcars and other general industrial products. Furthermore, since so-called fiber-reinforced polyester resins, which are produced by blending a reinforcing agent such as inorganic filler, particularly a fibrous reinforcing agent, with these thermoplastic polyester resins, have largely improved mechanical properties, the range of their applications has been expanding.

In particular, in the interior and exterior parts of vehicles such as automobiles, trains and electric railcars, those of aircraft fuselages and the like, more specifically, for example, in those interior parts of inner mirror stays, door handles, handstraps and assist handles, as well as those exterior parts of windshield wipers such as wiper arms, door handles, door mirror stays and roof rails, lightness in weight, high strength, high rigidity and excellent outer appearance are demanded. As a material for producing these parts, for example, reinforced thermoplastic resins, particularly fiber-reinforced polyester resins, are employed.

In order to improve the strength and rigidity of a resin molded article obtained from a fiber-reinforced thermoplastic resin, it is necessary to increase the amount of filler, for example, a fibrous filler (reinforcing agent or toughening agent), which is blended in a thermoplastic resin serving as substrate. However, when the blended amount of the reinforcing agent is increased, there arises a problem in that the moldability (fluidity) of the fiber-reinforced resin composition is decreased, making the blended fibrous reinforcing agent more likely to appear on the surface of a resulting product (molded article), which leads to, for example, a deterioration in the outer appearance of the product due to rough surface and reduced gloss and an increase in the shrinkage anisotropy (mold shrinkage rate), such as warpage, of the molded article.

For the purpose of preventing the surface properties such as outer appearance from being deteriorated while improving the strength by adding those fibrous reinforcing agents, for example, surface treatment of the fibrous reinforcing agents and use of an epoxy resin and silane coupling agent have been proposed.

For example, the Patent Document 1 proposes resin compositions in which, in order to improve the adhesion (affinity) between a substrate resin and fibrous reinforcing agent at their interface, the surface of the fibrous reinforcing agent is treated with a multifunctional compound (for example, epoxysilane, isocyanate compound or polycarboxylic acid anhydride) or the multifunctional compound is added together with the fibrous reinforcing agent to the substrate resin.

In addition, the Patent Documents 2 to 6 propose a technique for improving the electrical and mechanical properties of a reinforced resin composition by using, as a fibrous reinforcing agent blended in a PBT composition and the like, a fibrous reinforcing agent whose surface is treated with specific compounds, for example, an epoxy resin and aminosilane coupling agent.

On another front, in the Patent Document 7, it is reported that a metal salt of a sulfonamide compound is added to improve the crystallization rate of a polyester resin.

RELATED ART DOCUMENTS

Patent Documents

Patent Document 1: Japanese Examined Patent Application Publication No. 51-7702
Patent Document 2: Japanese Unexamined Patent Application Publication No. H9-301746
Patent Document 3: Japanese Unexamined Patent Application Publication No. 2001-172055
Patent Document 4: Japanese Unexamined Patent Application Publication No. 2001-172056
Patent Document 5: Japanese Unexamined Patent Application Publication No. 2001-172057
Patent Document 6: Japanese Unexamined Patent Application Publication No. 2006-16557
Patent Document 7: Japanese Unexamined Patent Application Publication No. 2007-327028

SUMMARY OF THE INVENTION

Problems to be Solved by the Invention

However, these techniques described in the Patent Documents 1 to 6 have limited flexibility and economical problems in that a special treatment must be performed on a fibrous reinforcing agent and that a special reinforcing agent is required. In addition, the surface properties, such as outer appearance, of resulting molded articles are not satisfactory and there is also a problem in terms of the shrinkage anisotropy of the molded articles. Furthermore, it is not described in the Patent Document 7 that the surface properties of the polyester resin can be improved and a superior molded article having no shrinkage anisotropy can be obtained when a fibrous filler is used in combination, and such a knowledge cannot be obtained as well from the Patented Document 7.

In view of the above, an object of the present invention is to provide a polyester resin composition having a high crystallization rate and superior moldability, from which a molded article having low shrinkage anisotropy such as warpage and superior surface properties such as outer appearance can be obtained.

Means for Solving the Problems

In order to solve the above-described problems, the present inventors intensively studied to discover that the above-described problems can be solved by adding an inorganic filler and specific metal salt of a sulfonamide compound to a polyester resin, thereby completing the present invention.

That is, the polyester resin composition according to the present invention comprises, with respect to 100 parts by mass of a polyester resin,
0.01 to 400 parts by mass of an inorganic filler as component (A) and
0.001 to 10 parts by mass of a metal salt of a sulfonamide compound as component (B), the metal salt of the sulfonamide compound having a structure represented by the following Formula (1):

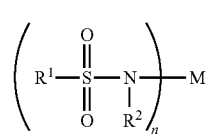

(1)

(wherein, $R^1$ and $R^2$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; $R^1$ and $R^2$ are also optionally linked together to form a cyclic group; n represents number of 1 or 2; when n is 1, M represents an alkali metal atom or $Al(OH)_{3-n}$; when n is 2, the plural $R^1$s and $R^2$s are each optionally different; M represents a divalent metal atom selected from magnesium, calcium, strontium, barium, titanium, manganese, iron, zinc, silicon, zirconium, yttrium and hafnium, $Al(OH)_{3-n}$ or linking group selected from the group consisting of a $C_1$-$C_{12}$ alkylene group which is optionally substituted, $C_2$-$C_{12}$ alkenylene group which is optionally substituted, $C_3$-$C_8$ cycloalkylene group which is optionally substituted, $C_4$-$C_{20}$ alkylene group having an ether bond, alkylene group which is interrupted by a cycloalkylene group and has a total of 5 to 20 carbon atoms, $C_6$-$C_{12}$ arylene group which is optionally substituted and a combination thereof; and when M is the linking group, either of $R^1$ and $R^2$ is an alkali metal).

In addition, it is preferred that the polyester resin composition according to the present invention further comprise, with respect to 100 parts by mass of the above-described polyester resin, 0.1 to 20 parts by mass of at least one polyether ester-based plasticizer and/or benzoate-based plasticizer as component (C).

Further, in the polyester resin composition according to the present invention, it is preferred that the M in the Formula (1) representing the above-described component (B) be an alkali metal atom.

Further, in the polyester resin composition according to the present invention, it is preferred that the metal salt of the sulfonamide compound, which is the above-described component (B), have a structure represented by the following Formula (2):

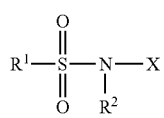

(2)

(wherein, $R^1$ and $R^2$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; $R^1$ and $R^2$ are also optionally linked together to form a cyclic group; and X represents an alkali metal atom).

Further, in the polyester resin composition according to the present invention, it is preferred that the metal salt of the sulfonamide compound, which is the above-described component (B), have a structure represented by the following Formula (3):

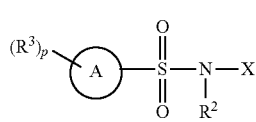

(3)

(wherein, ring A represents a $C_3$-$C_{30}$ cyclic group; $R^2$ and $R^3$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{27}$ cyclic group which is optionally substituted; $R^2$ and $R^3$ are also optionally linked together to form a cyclic group; X represents an alkali metal atom; p represents an integer of 0 to 3; when p is an integer of not less than 2, the plural $R^3$s are each optionally different; and a total number of carbon atoms of ring A and all of $R^3$s is 3 to 30).

Further, in the polyester resin composition according to the present invention, it is preferred that the metal salt of the sulfonamide compound, which is the above-described component (B), have a structure represented by the following Formula (4):

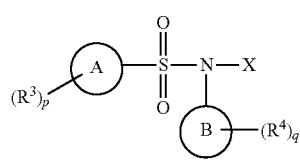

(4)

(wherein, ring A and ring B independently represent a $C_3$-$C_{30}$ cyclic group; $R^3$ and $R^4$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{27}$ cyclic group which is optionally substituted; $R^3$ and $R^4$ are also optionally linked together to form a cyclic group; X represents an alkali metal atom; p represents an integer of 0 to 3; when p is not less than 2, the plural $R^3$s are each optionally different; q represents an integer of 0 to 3; when q is not less than 2, the plural $R^4$s are each optionally different; and a total number of carbon atoms of ring A and all of $R^3$s and that of ring B and all of $R^4$s are each 3 to 30).

Further, in the polyester resin composition according to the present invention, it is preferred the metal salt of the sulfonamide compound, which is the above-described component (B), have a structure represented by the following Formula (5):

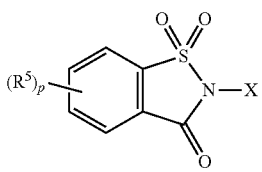

(5)

(wherein, R⁵ represents a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{24}$ cyclic group which is optionally substituted; X represents an alkali metal atom; p represents an integer of 0 to 3; and when p is not less than 2, the plural R⁵s are each optionally different).

Further, in the polyester resin composition according to the present invention, it is preferred that the metal salt of the sulfonamide compound, which is the above-described component (B), have a structure represented by the following Formula (6):

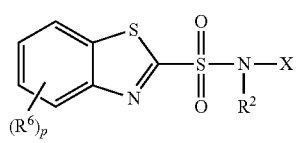

(6)

(wherein, R² and R⁶ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or cyclic group which is optionally substituted; when R² is the cyclic group, the cyclic group has 3 to 30 carbon atoms; when R⁶ is the cyclic group, the cyclic group has 3 to 23 carbon atoms; R² and R⁶ are also optionally linked together to form a cyclic group; X represents an alkali metal atom; p represents an integer of 0 to 3; and when p is not less than 2, the plural R⁶s are each optionally different).

Further, in the polyester resin composition according to the present invention, it is preferred that the metal salt of the sulfonamide compound, which is the above-described component (B), have a structure represented by the following Formula (7):

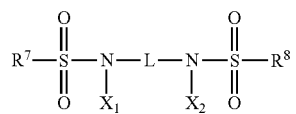

(7)

(wherein, R⁷ and R⁸ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; R⁷ and R⁸ are also optionally linked together to form a cyclic group; $X_1$ and $X_2$ independently represent an alkali metal atom; L is a linking group and represents a $C_1$-$C_{12}$ alkylene group which is optionally branched or substituted, $C_2$-$C_{12}$ alkenylene group which is optionally branched or substituted, $C_3$-$C_8$ cycloalkylene group which is optionally substituted, $C_4$-$C_{20}$ alkylene group having an ether bond, alkylene group which is interrupted by a cycloalkylene group and has a total of 5 to 20 carbon atoms or $C_6$-$C_{12}$ arylene group which is optionally branched or substituted).

Further, in the polyester resin composition according to the present invention, it is preferred that the metal salt of the sulfonamide compound, which is the above-described component (B), have an average particle diameter of not greater than 10 μm.

Further, in the polyester resin composition according to the present invention, it is preferred that the metal salt of the sulfonamide compound, which is the above-described component (B), have a water content of not greater than 3% by mass.

Further, in the polyester resin composition according to the present invention, it is preferred that the inorganic filler, which is the above-described component (A), be a fibrous inorganic filler.

Further, in the polyester resin composition according to the present invention, it is preferred that the inorganic filler, which is the above-described component (A), be a glass fiber.

Further, in the polyester resin composition according to the present invention, it is preferred that the above-described polyester resin comprise at least one selected from the group consisting of polyethylene terephthalate, polyethylene naphthalate, polytetramethylene terephthalate, polybutylene terephthalate and polylactic acid.

Further, in the polyester resin composition according to the present invention, it is preferred that the above-described polyester resin comprise polyethylene terephthalate.

Further, the polyester resin composition according to the present invention is characterized by comprising, with respect to 100 parts by mass of a polyester resin,
0.01 to 400 parts by mass of an inorganic filler as component (A) and
0.001 to 10 parts by mass of a metal salt of a sulfonamide compound as component (B), the metal salt of the sulfonamide compound having a structure represented by the following Formula (3):

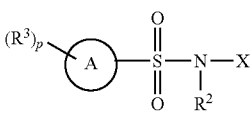

(3)

(wherein, ring A represents a $C_3$-$C_{30}$ cyclic group; R² and R³ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{27}$ cyclic group which is optionally substituted; R² and R³ are also optionally linked together to form a cyclic group; X represents an alkali metal atom; p represents an integer of 0 to 3; when p is an integer of not less than 2, the plural R³s are each optionally different; and a total number of carbon atoms of ring A and all of R³s is 3 to 30);
and further comprising 0.1 to 20 parts by mass of at least one polyether ester-based plasticizer and/or benzoate-based plasticizer as component (C) with respect to 100 parts by mass of the above-described polyester resin.

Further, the polyester resin composition according to the present invention is characterized by comprising, with respect to 100 parts by mass of a polyester resin,
0.01 to 400 parts by mass of an inorganic filler as component (A) and
0.001 to 10 parts by mass of a metal salt of a sulfonamide compound as component (B), the metal salt of the sulfonamide compound having a structure represented by the following Formula (5):

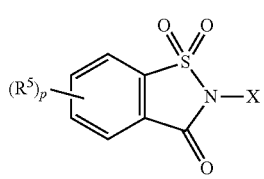

(5)

(wherein, $R^5$ represents a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{24}$ cyclic group which is optionally substituted; X represents an alkali metal atom; p represents an integer of 0 to 3; and when p is not less than 2, the plural $R^5$s are each optionally different);

and further comprising 0.1 to 20 parts by mass of at least one polyether ester-based plasticizer and/or benzoate-based plasticizer as component (C) with respect to 100 parts by mass of the above-described polyester resin.

Effects of the Invention

According to the present invention, a reinforced polyester resin composition having a high crystallization rate and superior moldability, from which a molded article having low shrinkage anisotropy such as warpage and superior surface properties such as outer appearance can be produced, can be obtained. The reason why the metal salt of the sulfonamide compound used in the present invention exhibits superior effects is not clear; however, it is thought as follows. As an action mechanism of the metal salt of the sulfonamide compound of the present invention, one which promotes resin crystallization with an aid provided by the surface of a nucleating agent (a metal salt of a sulfonamide compound); and so-called chemical nucleation, which is an action mechanism starting with a reaction product of a nucleating agent and resin, are conceivable. These two action mechanisms are characteristically originated from the structure of the metal salt of the sulfonamide compound according to the present invention; therefore, in the present invention, it is believed that superior effects are exhibited because of a synergistic effect of these action mechanisms.

Mode for Carrying out the Invention

The reinforced polyester resin composition according to the present invention will now be described in detail.

The polyester resin used in the reinforced polyester resin composition of the present invention is an ordinary thermoplastic polyester resin and not particularly restricted. Examples thereof include aromatic polyesters such as polyethylene terephthalate, polyethylene naphthalate, polybutylene terephthalate, polybutylene naphthalate, polycyclohexanedimethylene terephthalate; polyetherester resins produced by copolymerization of a constituent of a polyester, other acid component and/or glycol component (e.g., an acid component such as isophthalic acid, adipic acid, sebacic acid, glutaric acid, diphenylmethane dicarboxylic acid or dimer acid and/or a glycol component such as hexamethylene glycol, bisphenol A or neopentylglycol alkylene oxide adduct); degradable aliphatic polyesters such as polyhydroxybutyrate, polycaprolactone, polybutylene succinate, polyethylene succinate, polylactic acid resins, polymalic acid, polyglycolic acid, polydioxanone and poly(2-oxetanone); and polyester resins in a broad sense such as aromatic polyester/polyether block copolymers, aromatic polyester/polylactone block copolymers and polyarylates. Thereamong, at least one polyester resin selected from polyethylene terephthalate, polyethylene naphthalate, polytetramethylene terephthalate, polybutylene terephthalate and polylactic acid is preferably used, and polyethylene terephthalate is especially preferred since it makes the effects of the present invention prominent.

Further, the above-described thermoplastic polyester resins may used individually, or as a blend of a plurality thereof (e.g., a blend of polyethylene terephthalate and polybutylene terephthalate) or copolymer thereof (e.g., a copolymer of polybutylene terephthalate and polytetramethylene glycol). Particularly, those thermoplastic polyester resins having a melting point of 200° C. to 300° C. are preferably used since they exhibit a property of excellent heat resistance.

Next, the inorganic filler, which is the component (A) of the present invention, will be explained.

The inorganic filler, which is the component (A) of the present invention, functions to provide reinforcement in the reinforced polyester resin composition according to the present invention. The inorganic filler, which is the component (A), can be appropriately selected in accordance with the purpose thereof from those inorganic fillers that are conventionally used for reinforcing thermoplastic resins. Inorganic fillers can be classified into fibrous, plate-form and particulate inorganic fillers based on their outer appearance. Specific examples of the fibrous fillers include glass fibers, carbon fibers, mineral fibers, metal fibers, ceramic whiskers, and wollastonite. Examples of the plate-form fillers include glass flakes, mica and talc, and examples of the particulate fillers include silica, alumina, glass beads and calcium carbonate.

The inorganic filler, which is the component (A), is selected in accordance with the property to be imparted to the final molded article (product). For example, in order to impart mechanical strength and rigidity to a molded article, a fibrous one, particularly a glass fiber, is selected, and a plate-form one, particularly mica or glass flake, is selected in order to obtain a molded article having low anisotropy and warpage. As particulate inorganic filler, taking the fluidity in the production of a molded article into consideration, the most suitable one for balancing the whole physical properties is selected.

In the present invention, fibrous inorganic fillers are particularly preferred since they impart mechanical strength and rigidity to the resulting molded article and are highly effective in making the reinforced polyester resin composition have high crystallization rate and excellent moldability, thereby enabling a molded article having low shrinkage anisotropy and excellent surface properties to be obtained. Among such fibrous inorganic fillers, glass fibers are most preferred.

The above-described inorganic filler, which is the component (A), is blended in an amount of 0.01 to 400 parts by mass with respect to 100 parts by mass of the polyester resin, and from the standpoints of mechanical strength, rigidity, shrinkage anisotropy and surface properties of resulting molded article, the amount is preferably 1 to 300 parts by mass, more preferably 5 to 200 parts by mass, still more preferably 10 to 100 parts by mass, most preferably 10 to 50 parts by mass. When the amount is less than 0.01 parts by mass, the mechanical strength and rigidity of the molded article become reduced, while an amount of greater than 400 parts by mass deteriorates the outer appearance and causes a rough surface, resulting in inferior surface properties.

It is also preferred that the above-described inorganic filler, which is the component (A), be subjected to a treatment with a surface treatment agent in advance in order to improve the affinity and adhesion thereof with reinforced polyester resin components at their interface. As the surface treatment agent, for example, aminosilane compounds and surface treatment agents comprising at least epoxy resin are suitable. Examples of the aminosilane compounds include γ-aminopropyl triethoxysilane, γ-aminopropyl trimethoxysilane and γ-(2-aminoethyl)aminopropyl trimethoxysilane.

The epoxy resins contained in the above-described surface treatment agent are generally classified into novolac-type epoxy resins and bisphenol-type epoxy resins, and novolac-type epoxy resins are preferred. Examples of preferred novolac-type epoxy resins include multifunctional epoxy resins such as phenol-novolac-type epoxy resins and cresol-novolac-type epoxy resins.

It is preferred that the surface treatment agent be adhered in advance to the inorganic filler, which is the component (A). This treatment can be performed by a conventionally known method. Specific examples of the method include (1) a method in which prescribed amounts of an inorganic filler and surface treatment agent are weighed and fed to a mixer, such as Henschel mixer, to be mixed with stirring; (2) a method in which a polyester resin, inorganic filler and treatment agent are all mixed together in a mixer and the resultant is melt-kneaded; and in cases where a fibrous inorganic filler such as glass fiber, carbon fiber or basalt fiber is used, (3) a method in which a surface treatment agent is adhered to the surface of the fibrous inorganic filler in the step of spinning process where, for example, monofilaments of the fibrous organic filler are bundled together.

In the surface treatment agent, in addition to the above-described aminosilane compound and epoxy resin, components such as urethane resin, acryl resin, antistatic agent, lubricant and water repellent agent may also be blended in such an amount that does not inhibit the properties of the surface treatment agent. Further, examples of other surface treatment agents include non-novolac-type and non-bisphenol-type epoxy resins, epoxysilane coupling agents and titanate-based coupling agents.

The type of the glass of the glass fiber most preferably used in the present invention is not particularly restricted and any known or commercially available glass fiber can be used. Examples of the type of the glass include E glass, C glass, D glass, T glass, H glass, A glass, S glass, S-2 glass and silica glass, and E glass is particularly preferred since it contains a low amount of alkaline component and has a favorable electrical property. The average fiber length of the glass fiber is preferably in the range of 0.1 to 20.0 mm. By making the average fiber length be not less than 0.1 mm, the reinforcing effect of the glass fiber is effectively demonstrated. Also, by making the average fiber length be not longer than 20 mm, the melt-kneading operation with the polyester resin and the production of a molded article from the reinforced polyester resin composition become easier and the shrinkage anisotropy and surface properties of the resulting molded article become superior. The average fiber length is more preferably in the range of 1 to 10 mm.

Next, the metal salt of the sulfonamide compound, which is the component (B) of the present invention, will be explained.

The component (B) of the present invention functions to impart a high crystallization rate and excellent moldability to the reinforced polyester resin composition according to the present invention. In addition, it also functions in such a manner that a molded article having low shrinkage anisotropy and excellent surface properties can be obtained.

The metal salt of the sulfonamide compound, which is the component (B) of the present invention, is represented by the following Formula (1).

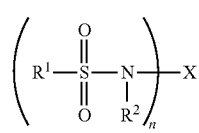
(1)

In the Formula (1), $R^1$ and $R^2$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; $R^1$ and $R^2$ are also optionally linked together to form a cyclic group; n represents number of 1 or 2; when n is 1, M represents an alkali metal atom or $Al(OH)_{3-n}$; when n is 2, the plural $R^1$s and $R^2$s are each optionally different; M represents a divalent metal atom selected from magnesium, calcium, strontium, barium, titanium, manganese, iron, zinc, silicon, zirconium, yttrium and hafnium, $Al(OH)_{3-n}$ or linking group selected from the group consisting of a $C_1$-$C_{12}$ alkylene group which is optionally substituted, $C_2$-$C_{12}$ alkenylene group which is optionally substituted, $C_3$-$C_8$ cycloalkylene group which is optionally substituted, $C_4$-$C_{20}$ alkylene group having an ether bond, alkylene group which is interrupted by a cycloalkylene group and has a total of 5 to 20 carbon atoms, $C_6$-$C_{12}$ arylene group which is optionally substituted and a combination thereof; and when M is the linking group, either of $R^1$ and $R^2$ is an alkali metal.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (2).

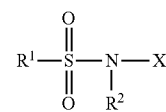
(2)

In the Formula (2), $R^1$ and $R^2$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; $R^1$ and $R^2$ are also optionally linked together to form a cyclic group; and X represents an alkali metal atom.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (3).

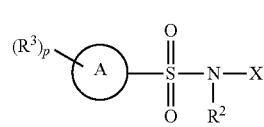
(3)

In the Formula (3), ring A represents a $C_3$-$C_{30}$ cyclic group; $R^2$ and $R^3$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{27}$ cyclic group which is optionally substituted; $R^2$ and $R^3$ are also optionally linked together to form a cyclic group; X represents an alkali metal atom; p represents an integer of 0 to 3; when p is an integer of not less than 2, the plural $R^3$s are each optionally different; and a total number of carbon atoms of ring A and all of $R^3$s is 3 to 30.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (4).

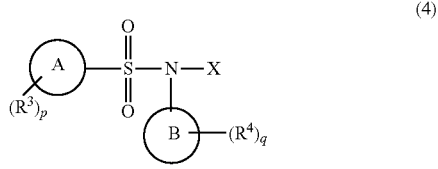

In the Formula (4), ring A and ring B independently represent a $C_3$-$C_{30}$ cyclic group; $R^3$ and $R^4$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{27}$ cyclic group which is optionally substituted; $R^3$ and $R^4$ are also optionally linked together to form a cyclic group; X represents an alkali metal atom; p represents an integer of 0 to 3; when p is not less than 2, the plural $R^3$s are each optionally different; q represents an integer of 0 to 3; when q is not less than 2, the plural $R^4$s are each optionally different; and a total number of carbon atoms of ring A and all of $R^3$s and that of ring B and all of $R^4$s are each 3 to 30.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (5).

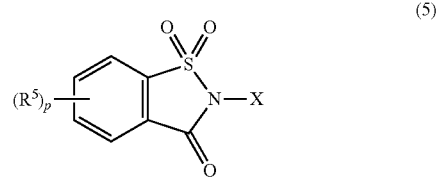

In the Formula (5), $R^5$ represents a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{24}$ cyclic group which is optionally substituted; X represents an alkali metal atom; p represents an integer of 0 to 3; and when p is not less than 2, the plural $R^5$s are each optionally different.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (6).

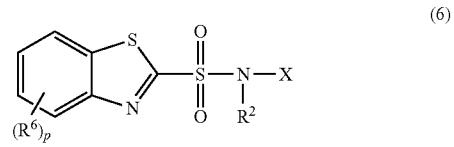

In the Formula (6), $R^2$ and $R^6$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or cyclic group which is optionally substituted; when $R^2$ is the cyclic group, the cyclic group has 3 to 30 carbon atoms; when $R^6$ is the cyclic group, the cyclic group has 3 to 23 carbon atoms; $R^2$ and $R^6$ are also optionally linked together to form a cyclic group; X represents an alkali metal atom; p represents an integer of 0 to 3; and when p is not less than 2, the plural $R^6$s are each optionally different.

Further, from the standpoints of the crystallization rate of the reinforced polyester resin composition and the shrinkage anisotropy and surface properties of the resulting molded article, it is preferred that the metal salt of the sulfonamide compound, which is the component (B) and represented by the Formula (1), have a structure represented by the Formula (7).

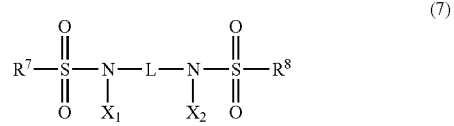

In the Formula (7), $R^7$ and $R^8$ independently represent a hydrogen atom, halogen atom, alkali metal atom, amino group, $C_1$-$C_{10}$ alkyl group which is optionally branched or substituted, $C_1$-$C_{10}$ alkoxy group which is optionally branched or substituted or $C_3$-$C_{30}$ cyclic group which is optionally substituted; $R^7$ and $R^8$ are also optionally linked together to form a cyclic group; $X_1$ and $X_2$ independently represent an alkali metal atom; L is a linking group and represents a $C_1$-$C_{12}$ alkylene group which is optionally branched or substituted, $C_2$-$C_{12}$ alkenylene group which is optionally branched or substituted, $C_3$-$C_8$ cycloalkylene group which is optionally substituted, $C_4$-$C_{20}$ alkylene group having an ether bond, alkylene group which is interrupted by a cycloalkylene group and has a total of 5 to 20 carbon atoms or $C_6$-$C_{12}$ arylene group which is optionally branched or substituted.

Examples of the metal in the metal salt of the sulfonamide compound, which is the above-described component (B), include alkali metals, alkaline earth metals, transition metals, base metals, noble metals, heavy metals, light metals, semimetals and rare metals. Concrete examples thereof include lithium, sodium, potassium, beryllium, magnesium, calcium, strontium, barium, radium, scandium, titanium, vanadium, chromium, manganese, iron, cobalt, nickel, copper, yttrium, zirconium, niobium, molybdenum, technetium, ruthenium, rhodium, palladium, silver, aluminium, zinc, gold, platinum, iridium, osmium, mercury, cadmium, arsenic, tungsten, tin, bismuth, boron, silicon, germanium, tellurium, polonium, gallium, germanium, rubidium, zirconium, indium, antimony, cesium, hafnium, tantalum and rhenium, and a hydroxide of lithium, sodium, potassium, magnesium, calcium, strontium, barium, titanium, manganese, iron, zinc, silicon, zirconium, yttrium, hafnium or aluminum is preferably used. In particular, from the standpoints of the crystallization rate of the reinforced polyester resin composition and the shrinkage anisotropy and surface properties of the resulting molded article, alkali metals such as lithium, sodium, potassium, rubidium and cesium are preferred.

Examples of the $C_1$-$C_{10}$ alkyl group which is optionally branched or substituted, which is represented by $R^1$ to $R^8$ in the Formulae (1) to (7) representing the above-described component (B), include methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, tert-octyl, nonyl and decyl. In such alkyl groups, an arbitrary —$CH_2$— is optionally substituted with —O—, —CO—, —COO— or —$SiH_2$— and some or all of the hydrogen atoms therein are optionally substituted with a halogen atom, such as fluorine, chlorine, bromine or iodine, or cyano group.

Examples of the $C_1$-$C_{10}$ alkoxy group which is optionally branched or substituted, which is represented by $R^1$ to $R^8$ in the Formulae (1) to (7) representing the above-described component (B), include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy and decyloxy. In such alkoxy groups, an arbitrary —$CH_2$— is optionally substituted with —O—, —CO—, —COO— or —$SiH_2$— and some or all of the hydrogen atoms therein are optionally substituted with a halogen atom, such as fluorine, chlorine, bromine or iodine, or cyano group.

The $C_3$-$C_{30}$ cyclic group which is optionally substituted, which is represented by $R^1$ to $R^8$ in the Formulae (1) to (7) representing the above-described component (B), may be a monocyclic, polycyclic, fused or assembled ring and can be used regardless of whether it is an aromatic cyclic group or saturated aliphatic cyclic group. The carbon atoms of the ring are optionally substituted with an oxygen atom, nitrogen atom sulfur atom or the like, and the ring optionally has an acyl group inside. Some or all of the hydrogen atoms of the ring are optionally substituted with a $C_1$-$C_5$ alkyl group, $C_1$-$C_5$ alkoxy group, halogen atom or amino group. Examples of such $C_3$-$C_{30}$ cyclic group include pyrrole, furan, thiophene, imidazole, pyrazole, oxazole, isoxazole, thiazole, isothiazole, pyridine, pyridazine, pyrimidine, pyrazine, piperidine, piperazine, morpholine, phenyl, naphthyl, anthracene, biphenyl, triphenyl, 2-methylphenyl(o-tolyl, cresyl), 3-methylphenyl(m-tolyl), 4-methylphenyl(p-tolyl), 4-chlorophenyl, 4-hydroxyphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl(xylyl), 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, cyclohexylphenyl, 2,4,5-trimethylphenyl(mesityl), 4-aminophenyl, 5-dimethylaminonaphthyl, 6-ethoxybenzothiazolyl, 2,6-dimethoxy-4-pyrimidyl, 5-methyl-1,3,4-thiadiazole-2-yl and 5-methyl-3-isoxazolyl. Further, examples of the $C_3$-$C_{23}$, $C_3$-$C_{24}$ and $C_3$-$C_{27}$ cyclic groups include, among those exemplified in the above, ones having a corresponding number of carbon atoms. Still further, examples of the cyclic groups formed by linkage between $R^1$ and $R^2$, $R^2$ and $R^3$, $R^3$ and $R^4$, $R^2$ and $R^6$, and $R^7$ and $R^8$ include the same cyclic groups as exemplified in the above.

Examples of the alkali metal atom, which is represented by X, $X_1$ and $X_2$ in the Formulae (2) to (7) representing the above-described component (B), include lithium atom, sodium atom and potassium atom. In particular, sodium atom is preferably used since it makes the effects of the present invention, such as an increase in the crystallization rate of the reinforced polyester resin composition and improvements in the shrinkage anisotropy and surface properties of the resulting molded article, prominent.

The linking group represented by L in the above-described Formula (7) is a $C_1$-$C_{12}$ alkylene group which is optionally branched or substituted, $C_2$-$C_{12}$ alkenylene group which is optionally branched or substituted, $C_3$-$C_8$ cycloalkylene group which is optionally substituted, $C_4$-$C_{20}$ alkylene group having an ether bond, alkylene group which is interrupted by a cycloalkylene group and has a total of 5 to 20 carbon atoms, $C_6$-$C_{12}$ arylene group which is optionally branched or substituted, or a combination thereof. Examples of the $C_1$-$C_{12}$ alkylene group include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, decylene, dodecylene, ethane-1,1-diyl and propane-2,2-diyl. Examples of the $C_2$-$C_{12}$ alkenylene group include vinylene, 1-methylethenylene, 2-methylethenylene, propenylene, butenylene, isobutenylene, pentenylene, hexenylene, heptenylene, octenylene, decenylene and dodecenylene. Examples of the $C_3$-$C_8$ cycloalkylene group include cyclopropylene, 1,3-cyclobutylene, 1,3-cyclopentylene, 1,4-cyclohexylene and 1,5-cyclooctylene. Examples of the $C_4$-$C_{20}$ alkylene group having an ether bond include those having an ether bond at the terminal of the carbon chain thereof or in the carbon chain thereof, and such alkylene groups may have only one ether bond or a plurality of consecutive ether bonds. Examples of the alkylene group which is interrupted by a cycloalkylene group and has a total of 5 to 20 carbon atoms include those having the above-described cycloalkylene group at the terminal of the carbon chain thereof or in the carbon chain thereof. Examples of the $C_6$-$C_{12}$ arylene group include aromatic cyclic groups such as 1,4-phenylene, 1,5-naphthalene, 2,6-naphthalene and biphenyl group, and the aromatic cyclic groups are optionally substituted.

In the present invention, as the linking group represented by L in the Formula (7), for example, methylene, 1,4-phenylene, 1,5-naphthalene, 2,6-naphthalene and biphenyl are particularly suitable. From the standpoints of the crystallization rate of the reinforced polyester resin composition and the shrinkage anisotropy and surface properties of the resulting molded article, the average particle diameter of the metal salt of the sulfonamide compound, which is the component (B) of the present invention, is preferably not greater than 10 μm, particularly preferably 5 μm. An average particle diameter of greater than 10 μm may result in insufficient crystallization effect for the polyester resin.

The metal salt of the sulfonamide compound, which is the component (B) of the present invention, has a water content of preferably not greater than 3% by mass, particularly preferably not greater than 1% by mass. When the water content is greater than 3% by mass, the above-described metal salt of the sulfonamide compound becomes likely to aggregate during transport and long-term storage, resulting in occurrence of blocking. Use of such metal salt of a sulfonamide compound has a problem in that the resin melt viscosity during molding is decreased and irregularities occur on the surface of the resulting molded article, which leads to a deterioration in the outer appearance.

Preferred examples of the above-described component (B) include the following Compounds No. 1 to No. 21; however, the present invention is not restricted thereto. From the standpoints of the crystallization rate of the reinforced polyester resin composition and the shrinkage anisotropy and surface properties of the resulting molded article, the Compound No. 16 is particularly preferred.

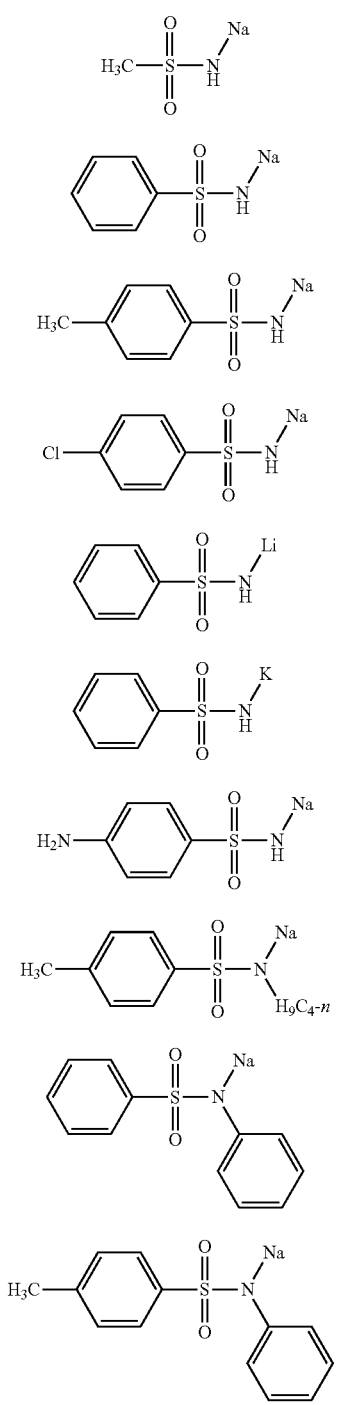

Compound No. 1

Compound No. 2

Compound No. 3

Compound No. 4

Compound No. 5

Compound No. 6

Compound No. 7

Compound No. 8

Compound No. 9

Compound No. 10

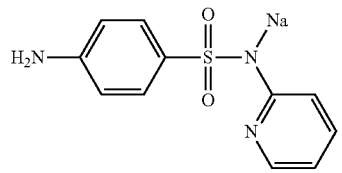

Compound No. 11

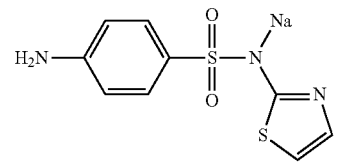

Compound No. 12

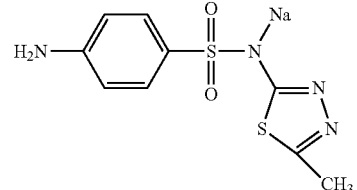

Compound No. 13

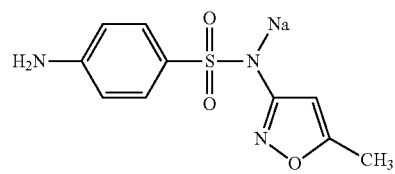

Compound No. 14

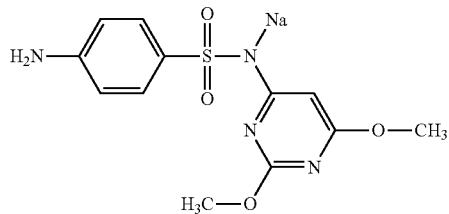

Compound No. 15

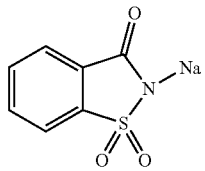

Compound No. 16

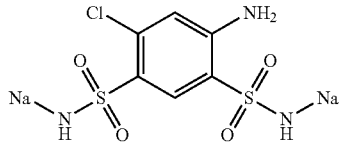

Compound No. 17

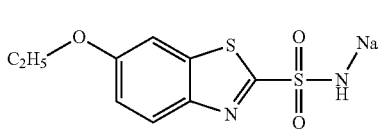

Compound No. 18

Compound No. 19

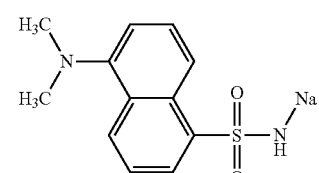

Compound No. 20

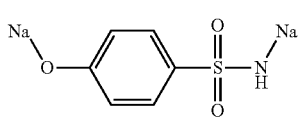

Compound No. 21

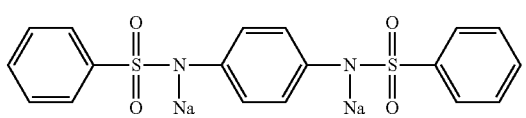

The above-described metal salt of the sulfonamide compound, which is the component (B), is blended in an amount of 0.001 to 10 parts by mass with respect to 100 parts by mass of the polyester resin. From the standpoints of the crystallization rate and moldability of the reinforced polyester resin composition and the shrinkage anisotropy and surface properties of the resulting molded article, the amount is preferably 0.005 to 5 parts by mass, more preferably 0.01 to 3 parts by mass, still more preferably 0.02 to 1 parts by mass, most preferably 0.05 to 0.5 parts by mass. When the amount is less than 0.001 parts by mass, the effect of the addition is not sufficient, while when the amount is greater than 10 parts by mass, the outer appearance of the resulting molded article is deteriorated.

It is preferred that the reinforced polyester resin composition according to the present invention further comprise a plasticizer as component (C). Particularly, from the standpoints of the crystallization rate and moldability of the reinforced polyester resin composition and the shrinkage anisotropy and surface properties of the resulting molded article, it is preferred that the reinforced polyester resin composition according to the present invention comprise 0.1 to 20 parts by mass of at least one polyether ester-based plasticizer and/or benzoate-based plasticizer.

Examples of the above-described polyether ester-based plasticizer, which is the component (C), include polyethylene glycol butyrate, polyethylene glycol isobutyrate, polyethylene glycol di(2-ethylbutyric acid)ester, polyethylene glycol (2-ethylhexylic acid)ester, polyethylene glycol decanoate, dibutoxyethanol adipate, di(butyldiglycol)adipate, di(butylpolyglycol)adipate, di(2-ethylhexyloxyethanol)adipate, di(2-ethylhexyldiglycol)adipate, di(2-ethylhexylpolyglycol) adipate, dioctoxyethanol adipate, di(octyldiglycol)adipate and di(octylpolyglycol)adipate. Specific examples of the above-described polyether ester-based plasticizer include Adekasizers RS-107, RS-1000, RS-735 and RS-700 (all of which are manufactured by ADEKA Corporation).

Examples of the above-described benzoate-based plasticizer, which is the component (C), include ethylene glycol benzoate, diethylene glycol dibenzoate, triethylene glycol dibenzoate, polyethylene glycol dibenzoate, propylene glycol dibenzoate, dipropylene glycol dibenzoate, tripropylene glycol dibenzoate, 1,3-butanediol dibenzoate, 1,4-butanediol dibenzoate, 1,6-hexanediol dibenzoate, 3-methyl-1,5-pentanediol dibenzoate and 1,8-octanediol dibenzoate. An example of commercially available benzoate-based plasticizers is EB-400 (manufactured by Sanyo Chemical Industries, Ltd.).

The above-described component (C) is blended in an amount of preferably 0.1 to 20 parts by mass, more preferably 0.5 to 15 parts by mass, still more preferably 1 to 10 parts by mass, most preferably 1 to 5 parts by mass, with respect to 100 parts by mass of the polyester resin. When the amount is less than 0.1 parts by mass, the effect of the component (C) is not sufficient, while when the amount is greater than 20 parts by mass, the plasticizer may bleed-out.

In the present invention, plasticizer(s) other than the above-described polyether ester-based plasticizers and benzoate-based plasticizers may also be blended.

Examples of the above-described other plasticizer(s) include polyester-based plasticizers. That is, the polyester-based plasticizers refer to those plasticizers in which both terminals of the basic structure, which is a condensate of a polybasic acid and polyalcohol, are terminated by a monohydric alcohol component and/or monobasic acid.

Specific examples of the above-described polybasic acid include $C_4$-$C_{12}$ aliphatic dicarboxylic acids such as succinic acid, maleic acid, fumaric acid, glutaric acid, adipic acid, azelaic acid, sebacic acid and dodecane dicarboxylic acid; aromatic dicarboxylic acids such as phthalic acid, isophthalic acid and terephthalic acid; and anhydrides of these dicarboxylic acids. These may be used individually or two or more thereof may be used in combination.

Examples of the above-described polyalcohol include $C_2$-$C_{18}$ aliphatic glycols such as ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol(neopentylglycol), 2,2-diethyl-1,3-propanediol(3,3-dimethylolpentane), 2-n-butyl-2-ethyl-1,3-propanediol(3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol; and polyalkylene glycols such as diethylene glycol and dipropylene glycol. These may be used individually or two or more thereof may be used in combination.

Specific examples of the above-described monohydric alcohol include $C_8$-$C_{18}$ aliphatic alcohols such as octanol, isooctanol, 2-ethylhexanol, nonanol, isononanol, 2-methyloctanol, decanol, isodecanol, undecanol, dodecanol, tridecanol, tetradecanol, hexadecanol and octadecanol; alicyclic alcohols such as cyclohexanol; and aromatic alcohols such as benzyl alcohol, 2-phenylethanol, 1-phenylethanol, 2-phenoxyethanol, 3-phenyl-1-propanol and 2-hydroxyethyl benzyl ether. These may be used individually or two or more thereof may be used in combination.

Specific examples of the above-described monobasic acid include monocarboxylic acids such as caprylic acid, nonanoic acid, capric acid, undecylic acid and laurylic acid; monoesters of dicarboxylic acids; and diesters of tricarboxylic acids, and these may be used individually or two or more thereof may be used in combination.

Further, other examples of the above-described other plasticize(s) include alicyclic ester-based plasticizers, and example thereof include cyclohexane dicarboxylates, cyclohexane dicarboxylates having an epoxy group, and cyclohexane carboxylic acid anhydrides such as 1,2-cyclohexane dicarboxylic acid anhydride.

Still further, other examples of the above-described other plasticizer(s) include phthalate-based plasticizers such as ethylbenzyl phthalate, butylbenzyl phthalate, isobutylbenzyl phthalate, heptylbenzyl phthalate, (2-ethylhexyl)benzyl phthalate, n-octylbenzyl phthalate, nonylbenzyl phthalate, isononylbenzyl phthalate, isodecylbenzyl phthalate, undecylbenzyl phthalate, tridecylbenzyl phthalate, cyclohexylbenzyl phthalate, benzyl-3-(isobutyryloxy)-1-isopropyl-2,2-dimethylpropyl phthalate, myristylbenzyl phthalate, dibutyl phthalate, isobutyl phthalate, diheptyl phthalate, di-(2-ethylhexyl)phthalate, di-n-octyl phthalate, dinonyl phthalate, diisononyl phthalate, diisodecyl phthalate, diundecyl phthalate, ditridecyl phthalate, dicyclohexyl phthalate and diphenyl phthalate; isophthalates such as di-(2-ethylhexyl)isophthalate and diisooctyl isophthalate; tetrahydrophthalates such as di-2-ethylhexyl tetrahydrophthalate; adipates such as di-(2-ethylhexyl)adipate, dibutoxyethyl adipate and diisononyl adipate; azelates such as di-n-hexyl azelate and di-(2-ethylhexyl)azelate; sebacates such as di-n-butyl sebacate; maleates such as di-n-butyl maleate and di-(2-ethylhexyl)maleate; fumarates such as di-n-butyl fumarate and di-(2-ethylhexyl) fumarate; trimellitates such as tri-(2-ethylhexyl)trimellitate, tri-n-octyl trimellitate and triisooctyl trimellitate; pyromellitates such as tetra-(2-ethylhexyl)pyromellitate and tetra-n-octyl pyromellitate; citrates such as tri-n-butyl citrate and acetyltributyl citrate; itaconates such as dimethyl itaconate, diethyl itaconate, dibutyl itaconate and di-(2-ethylhexyl)itaconate; oleates such as glyceryl oleate and diethylene glycol oleate; ricinoleic acid derivatives such as glyceryl monoricinoleate and diethylene glycol monoricinoleate; other fatty acid esters such as stearates including glycerin monostearate and diethylene glycol distearate, diethylene glycol dipelargonate and pentaerythritol fatty acid esters; and phosphates such as tributoxyethyl phosphate, triphenyl phosphate, tricresyl phosphate, diphenyldecyl phosphate and diphenyloctyl phosphate. These may be used individually or two or more thereof may be used in combination.

Further, in the reinforced polyester resin composition according to the present invention, in addition to the above-described components (A) to (C), other commonly-used additive(s) may also be blended as required in such an amount that does not inhibit the effects of the present invention.

Examples of other additives include antioxidants such as phenolic, phosphorus-based and sulfur-based antioxidants; light stabilizers such as hindered amine-based light stabilizers and UV absorbers; lubricants such as hydrocarbon-based lubricants, fatty acid-based lubricants, aliphatic alcohol-based lubricants, aliphatic ester-based lubricants, aliphatic amide-based compounds, aliphatic carboxylic acid metal salts and other metallic soaps thereof; heavy metal inactivators; anti-clouding agents; antistatic agents such as cationic surfactants, anionic surfactants, nonionic surfactants and ampholytic surfactants; halogen compounds; phosphate compounds, amide phosphate compounds; melamine compounds; fluorocarbon resins or metal oxides; flame retardants such as (poly)melamine phosphate and (poly)piperazine phosphate; fillers such as glass fibers and calcium carbonate; pigments; silicate-based inorganic additives such as hydrotalcite, fumed silica, fine-particle silica, silica rock, diatomites, clay, kaolin, diatomaceous earth, silica gel, calcium silicate, sericite, kaolinite, flint, feldspar powder, vermiculite, attapulgite, talc, mica, minnesotite, pyrophyllite and silica; and nucleating agents. Particularly, phenolic and phosphorous-based antioxidants are preferably used since they are effective as an anti-coloring agent for polyolefin-based resin compositions.

Examples of the above-described phenolic antioxidants include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butylic acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane and triethylene glycolbis[β-(3-tert-butyl-4-hydroxy-5-methylphenyl)propionate].

Examples of the above-described phosphorous-based antioxidants include triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono-, di-mixed nonylphenyl)phosphite, diphenyl acid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol)-1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra (C12-15 mixed alkyl)-4,4'-isopropylidene diphenylphosphite, bis[2,2'-methylenebis(4,6-diamylphenyl)]-isopropylidene diphenylphosphite, tetratridecyl-4,4'-butylidenebis(2-tert-butyl-5-methylphenol)diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepine-6-yl)oxy]ethyl) amine, 9,10-dihydro-9-oxa-10-phosphaphenanthrene-10-oxide and 2-butyl-2-ethylpropanediol-2,4,6-tri-tert-butylphenol monophosphite.

Examples of the above-described sulfur-based antioxidants include dialkyl thiodipropionates such as dilauryl, dimyristyl, myristylstearyl and distearyl thiodipropionates; and β-alkylmercapto propionic acid esters of polyols such as pentaerythritol tetra(β-dodecylmercaptopropionate).

Examples of the above-described hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl) sebacate, bis(1-octoxy-2,2,6,6-tetramethyl-4-piperidyl) sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-bis(tridecyl)-1,2,3,4-butane tetracarboxylate, bis(1,2,2,6,6-pentamethyl-4-piperidyl)-bis(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 1-(2-hydroxyethyl)-2,2,6,6-tetramethyl-4-piperidinol/diethyl succinate polycondensate and 1,6-bis(2,2,6,6-tetramethyl-4-piperidylamino)hexane/dibromoethane polycondensate.

Examples of the above-described UV absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and a variety of metal salts and metal chelates, particularly salts and chelates of nickel and chromium.

Examples of the aliphatic amide-based compounds used as the above-described lubricant include mono-fatty acid amides such as lauric acid amide, stearic acid amide, oleic acid amide, erucic acid amide, ricinoleic acid amide and 12-hydroxy stearic acid amide; N,N'-bis-fatty acid amides such as N,N'-ethylenebis lauric acid amide, N,N'-methylenebis stearic acid amide, N,N'-ethylenebis stearic acid amide, N,N'-ethylenebis oleic acid amide, N,N'-ethylenebis behenic acid amide, N,N'-ethylenebis-12-hydroxy stearic acid amide, N,N'-butylenebis stearic acid amide, N,N'-hexamethylenebis stearic acid amide, N,N'-hexamethylenebis oleic acid amide and N,N'-xylylenebis stearic acid amide; alkylol amides such as stearic acid monomethylol amide, coconut oil fatty acid monoethanol amide and stearic acid diethanol amide; N-substituted fatty acid amides such as N-oleyl stearic acid amide, N-oleyl oleic acid amide, N-stearyl stearic acid amide, N-stearyl oleic acid amide, N-oleyl palmitic acid amide and N-stearyl erucic acid amide; and N,N'-substituted dicarboxylic acid amides such as N,N'-dioleyl adipic acid amide, N,N'-distearyl adipic acid amide, N,N'-dioleyl sebacic acid amide, N,N'-distearyl sebacic acid amide, N,N'-distearyl terephthalic acid amide and N,N'-distearyl isophthalic acid amide. These may be used individually or two or more thereof may be used as a mixture.

Examples of the above-described flame retardants include phosphoric acid esters such as triphenyl phosphate, phenol-resorcinol-phosphorus oxychloride condensates, phenol-bisphenol A-phosphorus oxychloride condensates and 2,6-xylenol-resorcinol-phosphorus oxychloride condensates; phosphoric acid amides such as aniline-phosphorus oxychloride condensates, phenol-xylylenediamine-phosphorus oxychloride condensates; phosphazene; halogen-based flame retardants such as decabromodiphenyl ether and tetrabromo bisphenol A; phosphates of nitrogen-containing organic compounds such as melamine phosphate, piperazine phosphate, melamine pyrophosphate, piperazine pyrophosphate, melamine polyphosphate and piperazine polyphosphate; red phosphorus and surface-treated and microencapsulated red phosphorus; flame-retardant aids such as antimony oxide and zinc borate; and anti-drip agents such as polytetrafluoroethylene and silicone resins. The flame retardant(s) is/are added in an amount of preferably 1 to 30 parts by mass, more preferably 5 to 20 parts by mass, with respect to 100 parts by mass of the above-described polyester.

Examples of the above-described nucleating agents include metal salts of aromatic carboxylic acids such as aluminum p-t-butyl benzoate and sodium benzoate; acidic metal phosphates such as sodium-bis(2,4-di-tert-butylphenyl)phosphate, lithium-bis(2,4-di-tert-butylphenyl)phosphate and sodium-2,2'-methylenebis(4,6-di-tert-butylphenyl)phosphate; polyalcohol derivatives such as dibenzylidene sorbitol, bis(p-methylbenzylidene)sorbitol and bis(p-ethylbenzylidene)sorbitol; and disodium-bicyclo[2.2.1]heptane-2,3-dicarboxylate.

Further, in the reinforced polyester resin composition according to the present invention, the method of blending the inorganic filler (component (A)), the metal salt of the sulfonamide compound (component (B)), the plasticizer (component (C)) and, if desired, other additive(s) with the above-described polyester resin is not particularly restricted and these can be blended by a conventionally known method. For example, powder or pellet of the above-described polyester resin and the components may be mixed by dry-blending, or a part of the components may be preblended and then dry-blended with the remaining components. After the dry-blending, the resultant may also be mixed by a mill roll, Banbury mixer, super mixer or the like and kneaded using a uniaxial or biaxial extruder. This kneading is usually carried out at a temperature of about 200 to 350° C. Further, it is also possible to employ, for example, a method in which the compounds and the like are added in the polymerization step of the polyester resin or a method in which a master batch containing the compounds and the like at high concentrations is prepared and then added to the polyester resin.

Similarly to ordinary plastics, the reinforced polyester resin composition according to the present invention is mainly used as a molding material for a variety of molded articles. Since the resulting molded articles have excellent mechanical strength, outer appearance and shrinkage anisotropy, they are particularly suitable for interior and exterior parts of vehicles such as automobiles, trains and electric railcars, those of aircraft fuselages, parts of electric appliances and electronics, machine parts and electromechanical components. Examples thereof include automobile interior parts such as inner mirror stays, door handles, handstraps and assist handles; windshield wiper parts such as wiper arms; automobile exterior parts such as door handles, door mirror stays and roof rails; automobile parts such as exhaust gas valves, fog light holders, light housings and oil filters; electronic parts such as switches, connectors, coil bobbins and condenser casings; electrical components such as handles of irons, hot plate frames and microwave oven parts; and other parts such as camera parts, chair arms, chemical pump parts and gas meter parts.

When molding the reinforced polyester resin composition according to the present invention, the molding can be carried out in the same manner as in the case of ordinary plastics by extrusion molding, injection molding, blow molding, vacuum molding, compression molding or the like, and a variety of molded articles such as sheets, rods, bottles, containers and plates can be easily obtained.

EXAMPLES

The present invention will now be described more concretely by way of production examples and examples; however, the present invention is not restricted thereto by any means.

Production Example

After mixing 100 parts by mass of a polyethylene terephthalate resin (for injection molding; MA-2103 manufactured by Unitika, Ltd., IV=0.68) and the component (B) shown in Table 1 below, the resulting resin composition was dried under reduced pressure for 5 hours at 150° C. and fed to a biaxial extruder (TEX30α; manufactured by The Japan Steel Works, Ltd.) by a volumetric feeder. Further, the components (C) and (A) were volumetrically fed to the extruder using a liquid addition apparatus and side feeder, respectively, and kneading was carried out at a cylinder temperature of 270° C. and a screw speed of 200 rpm to obtain a pellet. The thus obtained pellet was dried at 150° C. for 5 hours and then subjected to the evaluations described below.

The Compound No. 16, which was used as the component (B), had an average particle diameter of 2.5 μm and a water content of 0.1% by mass. The average particle diameter was measured by a dry method using a laser diffraction-scattering Microtrac particle size distribution analyzer MT-3300 EX (manufactured by Nikkiso Co., Ltd.).

[Crystallization Temperature (° C.)]

The crystallization temperature of the pellet obtained in the above was measured by the following method.

The thus obtained pellet was melted at 300° C. and then quenched using methanol cooled with dry ice. Using a differential scanning calorimeter (Diamond DSC; manufactured by PerkinElmer Co., Ltd.), after elevating the temperature of the pellet to 300° C. at a rate of 10° C./min, the pellet was maintained at this temperature for 1 minute and subsequently cooled to 50° C. at a rate of −10° C./min. The crystallization temperature (elevating temperature) was determined from the exothermic peak top temperature when the temperature of the pellet was elevated, and the crystallization temperature (decreasing temperature) was determined from the exothermic peak top temperature when the temperature of the pellet was lowered. The lower the crystallization temperature (elevating temperature) and the higher the crystallization temperature (decreasing temperature), the faster the crystallization rate becomes. The results are shown in Table 1 below.

[Shrinkage Anisotropy (Warpage Value)]

The thus obtained pellet (which was dried at 150° C. for 5 hours) was injection-molded at a die temperature of 110° C. and a resin temperature of 270° C. to obtain a planar test piece having a dimension of about 100×100×2 mm. The thus obtained planar test piece was sandwiched between two flat plates in such a manner that the test piece was in contact with the plates, and the space created between the two plates was measured using a caliper. The thickness of the test piece was subtracted from the thus measured value to obtain a warpage value. This measurement was carried out five times and an average value was determined. The results are shown in Table 1.

[Surface Property (Outer Appearance)]

The outer appearance of the surface of the planar test piece obtained in the above was visually observed and evaluated based on the following evaluation criteria.

The results thereof are shown in Table 1.

<Outer Appearance Evaluation Criteria>

○: No roughness or glass fiber was observed on the surface.

Δ: Minor glass fiber appearance was observed and the surface was slightly rough.

×: Glass fibers appeared and the surface was rough.

[Surface Property (Gloss)]

The gloss (gloss value) of the planar test piece obtained in the above was measured. The gloss was measured at a measurement angle of 60° using a glossmeter, Model TC-108D manufactured by Tokyo Denshoku Co., Ltd. The results of this measurement are shown in Table 1.

[Flexural Modulus]

The pellet obtained in the above (which was dried at 150° C. for 5 hours) was injection-molded at a die temperature of 110° C. and a resin temperature of 270° C. to prepare a test piece having a dimension of about 80×10×4 mm. The flexural modulus (GPa) of the thus obtained test piece was measured in accordance with ISO178. The results are shown in Table 1.

[Flexural Strength]

The pellet obtained in the above (which was dried at 150° C. for 5 hours) was injection-molded at a die temperature of 110° C. and a resin temperature of 270° C. to prepare a test piece having a dimension of about 80×10×4 mm. The flexural strength (MPa) of the thus obtained test piece was measured in accordance with ISO178. The results are shown in Table 1.

[Charpy Impact Strength]

The pellet obtained in the above (which was dried at 150° C. for 5 hours) was injection-molded at a die temperature of 110° C. and a resin temperature of 270° C. to prepare a test piece having a dimension of about 80×10×4 mm. The Charpy notched impact strength (KJ/m²) of the thus obtained test piece was measured in accordance with ISO179. The results are shown in Table 1.

[Temperature of Deflection Under Load (HDT)]

The pellet obtained in the above (which was dried at 150° C. for 5 hours) was injection-molded at a die temperature of 110° C. and a resin temperature of 270° C. to prepare a test piece having a dimension of about 80×10×4 mm. The temperature of deflection under load (° C.) of the thus obtained test piece was measured in accordance with ISO75 (a load of 1.8 MPa). The results are shown in Table 1.

TABLE 1

| | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Blend (parts by mass) | Polyester resin *1 | 100 | 100 | 100 | 100 | 100 | 100 | 100 | 100 | 100 | 100 |
| | Component (A) Glass fiber *2 | 42.9 | 42.9 | 42.9 | 42.9 | 42.9 | 42.9 | 100 | 42.9 | 42.9 | 100 |
| | Component (B) Compound No. 16 | 0.3 | 0.1 | 0.3 | 0.5 | 1.0 | 0.3 | 0.3 | — | — | — |
| Compo-nent (C) | Polyether ester-based plasticizer *3 | — | 3 | 3 | 3 | 3 | — | 3 | — | 3 | — |
| | Benzoate-based plasticizer *4 | — | — | — | — | — | 3 | — | — | — | — |
| Evaluation | Crystallization temperature (elevating temperature) (° C.) | 119.1 | 115.7 | 112.0 | 105.0 | 107.3 | 110.1 | 111.9 | 129.9 | 124.4 | 130.4 |
| | Crystallization temperature (lowering temperature) (° C.) | 227.2 | 221.4 | 223.4 | 224.7 | 225.5 | 224.9 | 223.9 | 212.9 | 208.7 | 212.7 |
| | Flexural modulus (GPa) | 10.5 | 10.4 | 10.8 | 10.6 | 10.7 | 11.1 | 17.7 | 10.0 | 10.0 | 17.1 |
| | Flexural strength (MPa) | 210 | 230 | 210 | 180 | 170 | 200 | 260 | 220 | 220 | 270 |
| | Charpy impact strength (KJ/m²) | 6.4 | 5.7 | 6.2 | 6.9 | 6.8 | 6.3 | 8.0 | 5.4 | 5.5 | 7.9 |
| | HDT(° C.) | 234 | 228 | 234 | 237 | 237 | 228 | 238 | 220 | 224 | 228 |
| | Outer appearance | ○ | ○ | ○ | ○ | ○ | ○ | ○ | X | X | X |
| | Gloss | 78 | 93 | 97 | 96 | 92 | 100 | 82 | 40 | 48 | 31 |
| | Warpage value (mm) | 1.6 | 2.9 | 2.2 | 4.2 | 4.0 | 2.8 | 0.8 | 4.7 | 4.1 | 3.5 |

*1 Polyethylene terephthalate for injection molding (manufactured by Unitika, Ltd.)
*2 Chopped glass strands having a fiber length of 3 mm (CS3J-941S, manufactured by Nisshinbo Holdings Inc.)
*3 Adekasizer RS-735 (manufactured by ADEKA Corporation)
*4 EB-400 (manufactured by Sanyo Chemical Industries, Ltd.)

As clearly seen from Table 1 in the above, as compared to the test pieces of the Examples 1 to 7, those of the Comparative Examples 1 to 3 comprising the component (A) but not the component (B) had a high crystallization temperature (elevating temperature) and a low crystallization temperature (decreasing temperature). Further, in terms of the outer appearance, for each of the planar test pieces of the Comparative Examples, it was observed that the glass fibers appeared and the surface was rough. The gloss (gloss value) was also low in all of the planar test pieces of the Comparative Examples. Moreover, all of the planar test pieces of the Comparative Examples had a large warpage value.

In contrast, in the Examples where the component (A) and component (B) were added to the polyester resin, from the data of the crystallization temperatures (elevating temperature) and crystallization temperatures (decreasing temperature), it is understood that resin compositions having a high crystallization rate were obtained. In addition, in terms of the outer appearance, no roughness or glass fiber was observed on the surfaces of those planar test pieces obtained in the Examples, and they had a high gloss (gloss value) and good outer appearance. Furthermore, all of the planar test pieces obtained in the Examples had a small warpage value and low shrinkage anisotropy.

From these results, it was confirmed in the Examples of the present invention that a reinforced polyester resin composition having a high crystallization rate and superior moldability, from which a molded article having low shrinkage anisotropy and superior surface properties can be produced, was able to be obtained.

The invention claimed is:

1. A reinforced polyester resin composition, which comprises, with respect to 100 parts by mass of a polyester resin,
   10 to 100 parts by mass of a glass fiber as component (A) and
   0.01 to 0.3 parts by mass of a metal salt of a sulfonamide compound as component (B), wherein component (B) is:

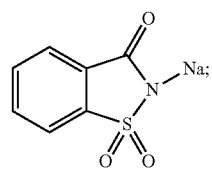

wherein said polyester resin comprises polyethylene terephthalate.

2. The reinforced polyester resin composition according to claim 1, which further comprises, with respect to 100 parts by mass of said polyester resin, 0.1 to 20 parts by mass of at least one polyether ester-based plasticizer and/or benzoate-based plasticizer as component (C).

3. The reinforced polyester resin composition according to claim 1, wherein said metal salt of said sulfonamide compound, which is said component (B), has an average particle diameter of not greater than 10 μm.

4. The reinforced polyester resin composition according to claim 1, wherein said metal salt of said sulfonamide compound, which is said component (B), has a water content of not greater than 3% by mass.

* * * * *